United States Patent [19]

Koelling, Sr.

[11] Patent Number: 4,637,807
[45] Date of Patent: Jan. 20, 1987

[54] SPLIT YOKE UNIVERSAL JOINT

[75] Inventor: Robert K. Koelling, Sr., Dallas, Tex.

[73] Assignee: Morgan Construction Company, Worcester, Mass.

[21] Appl. No.: 744,227

[22] Filed: Jun. 13, 1985

[51] Int. Cl.⁴ .............................................. F16D 3/40
[52] U.S. Cl. ..................................... 464/135; 403/344
[58] Field of Search .................. 403/57, 74, 157, 344; 464/30, 32, 33, 135, 134

[56] References Cited

U.S. PATENT DOCUMENTS

| | | | |
|---|---|---|---|
| 1,153,789 | 9/1915 | Hopkins | 464/135 X |
| 3,589,142 | 6/1971 | Lecomte | 464/135 |
| 3,751,080 | 8/1973 | Bailey et al. | 403/344 |
| 4,180,989 | 1/1980 | Lange | 464/135 |
| 4,334,415 | 6/1982 | Hopkins et al. | 464/134 X |

OTHER PUBLICATIONS

"New Heavy Duty Drive Shaft", Koyo Seiko Co., Ltd., published approximately 1975.
"Koelling Model SRK Universal Joints", published approximately 1979.

Primary Examiner—Stuart S. Levy
Assistant Examiner—Daniel P. Stodola
Attorney, Agent, or Firm—Thompson, Birch

[57] ABSTRACT

A universal joint has a cross formed by two mutually perpendicular pairs of coaxial trunnions, each pair of trunnions being rotatably received in bearings which in turn are coaxially retained in the bearing caps of one of two yokes. The yokes are subdivided into half sections which each include one of the bearing caps. The half sections of each yoke are separably interconnected with a juncture therebetween defined by confronting mating surfaces. Interengaging elements are provided at the juncture for preventing the thus interconnected half sections from shifting in relation to each other in directions which disturb the coaxial alignment of the bearings.

4 Claims, 9 Drawing Figures

SPLIT YOKE UNIVERSAL JOINT

BACKGROUND OF THE INVENTION

1. Field of the Invention

This invention relates to an improvement in the design of Hooke's or Cardan type universal joints.

2. Description of the Prior Art

In the conventional Hooke's or Cardan type universal joint, the trunnions of a cross are rotatably supported by bearings in the bearing caps of a complimentary pair of yokes. One yoke is normally attached to a spindle, and the other yoke is attached either to the output shaft of a drive, or to the input shaft of a driven device.

In most cases, the bearing caps of each yoke are integrally joined, and the bearings are assembled in the bearing caps in through bores closed by removable side covers. It has been found, however, that the structural stiffness of the bearing caps is compromised by the through bores to an extent sufficient to render this arrangement unsuitable for certain high load applications.

In an attempt at overcoming this difficulty, the conventional through bores in the bearing caps have been eliminated in favor of blind bores. By employing blind bores the structural stiffness of the bearing caps is significantly increased as compared with the prior through bore designs. However, in order to permit yokes with blind bores to be assembled onto the trunnions of the cross, the yokes must be subdivided into separable half sections, each including one of the bearing caps. Following assembly, the half sections must be reliably interconnected in mutually fixed alignment with respect to each other. Otherwise, if the half sections are allowed to shift or move relative to each other while the universal joint is in service, the bearing assemblies will be subjected to unbalanced loading, causing accelerated wear. Relative shifting of the half sections can also loosen the flange bolts and nuts, in addition to disrupting the original interference fit of flange face keys.

SUMMARY OF THE PRESENT INVENTION

The primary purpose of the present invention is to provide an improved means of reliably maintaining the separable yoke half sections and their respective bearing caps in mutually fixed alignment while the universal joint is in service.

To this end, the half sections of each yoke are separably interconnected, with the juncture therebetween being defined by confronting mating juxtaposed surfaces. Interengageable elements or components are located at the juncture for preventing the thus interconnected half sections from shifting in relation to each other in directions which disturb the coaxial alignment of the bearings. In one embodiment to be hereinafter described in more detail, the mating surfaces are essentially flat and parallel and are provided with confronting centrally located keyways. A key is received in the confronting keyways. The key has load carrying side surfaces which are tightly fitted between and which cooperate with adjacent side surfaces of the keyways to prevent the aforesaid shifting of the yoke half sections relative to each other.

The means for separably interconnecting the half sections preferably includes one or more tie bolts or other like connecting elements extending through the half sections in a direction or directions perpendicular to the juncture of the mating surfaces.

Preferably, the mating surfaces of the yoke half sections additionally include confronting channels on opposite sides of the centrally located keyways. Spacer blocks are received in the confronting channels. The spacer blocks have oppositely facing surfaces which cooperate with the bottoms of the channels to laterally locate the yoke half sections with respect to each other.

In alternate embodiments which also will be hereinafter described in greater detail, different types of interengageable components or surfaces are provided at the juncture between the two separable half sections.

The invention will now be described in greater detail with reference to the accompanying drawings, wherein:

DETAILED DESCRIPTION OF ILLUSTRATED EMBODIMENTS

Figure 1:
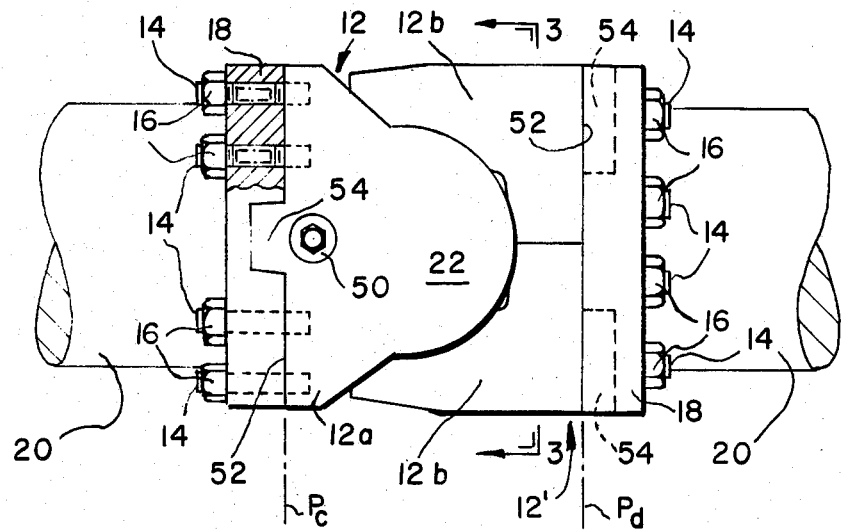
FIG. 1 is a side view of a universal joint in accordance with the present invention.
Figure 2:
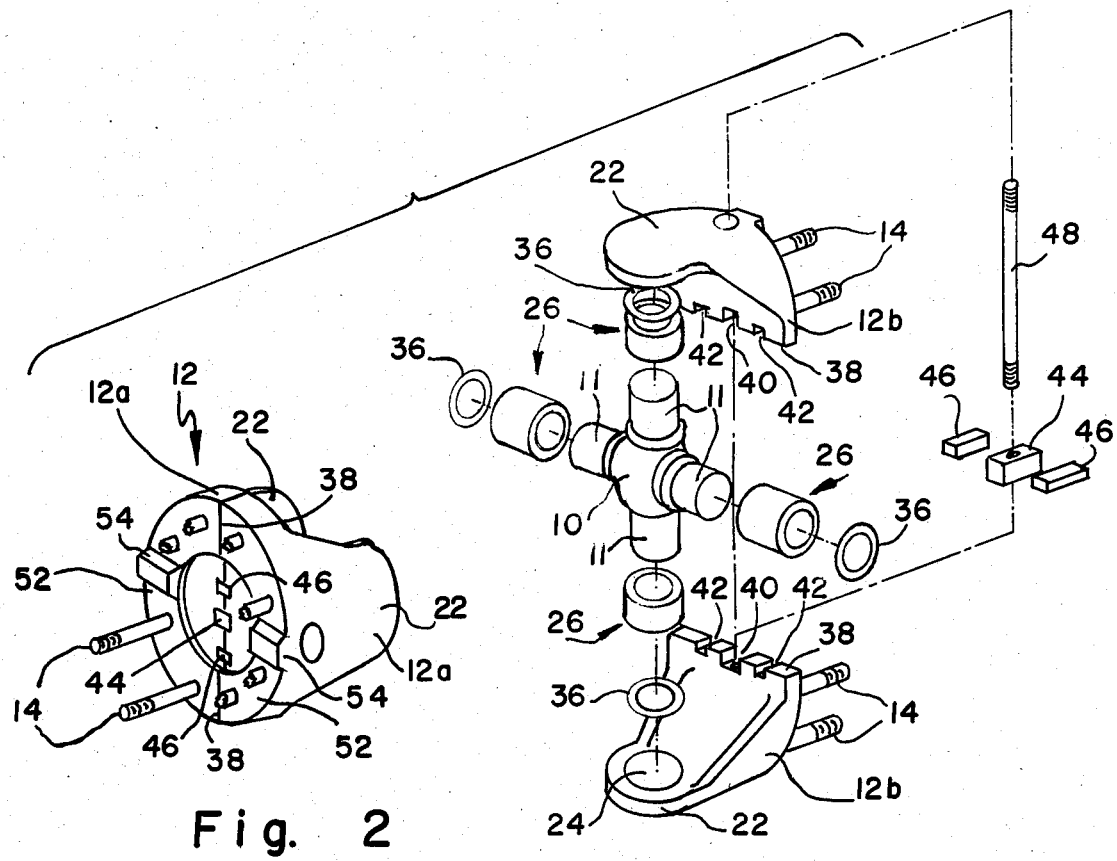
FIG. 2 is a perspective partially exploded view of the universal joint shown in FIG. 1.

Referring initially to FIGS. 1–5, one embodiment of a universal joint in accordance with the present invention is shown including a cross 10 formed by two mutually perpendicular pairs of coaxial trunnions 11, with a pair of yokes 12,12' mounted thereon. The yokes have rearwardly protruding threaded studs indicated typically at 14 and integral rearwardly protruding keys 15. The keys 15 are received in recesses in and serve to mechanically couple the yokes to flanges 18 on spindles, drive shafts or the like (indicated in phantom at 20 in FIG. 1). The yokes and their respective shaft end flanges have mutually abutting surfaces, and the studs 14 cooperate with nuts 16 to detachably mount the former to the latter. The yokes 12,12' are respectively subdivided into mating half sections 12a,12a and 12b,12b. Each half section includes an integral bearing cap 22 having an inwardly opening blind bore 24. The trunnions 11 are adapted to be rotatably received in bearing assemblies 26 which in turn are coaxially retained in the bearing caps 22.

Figure 5:
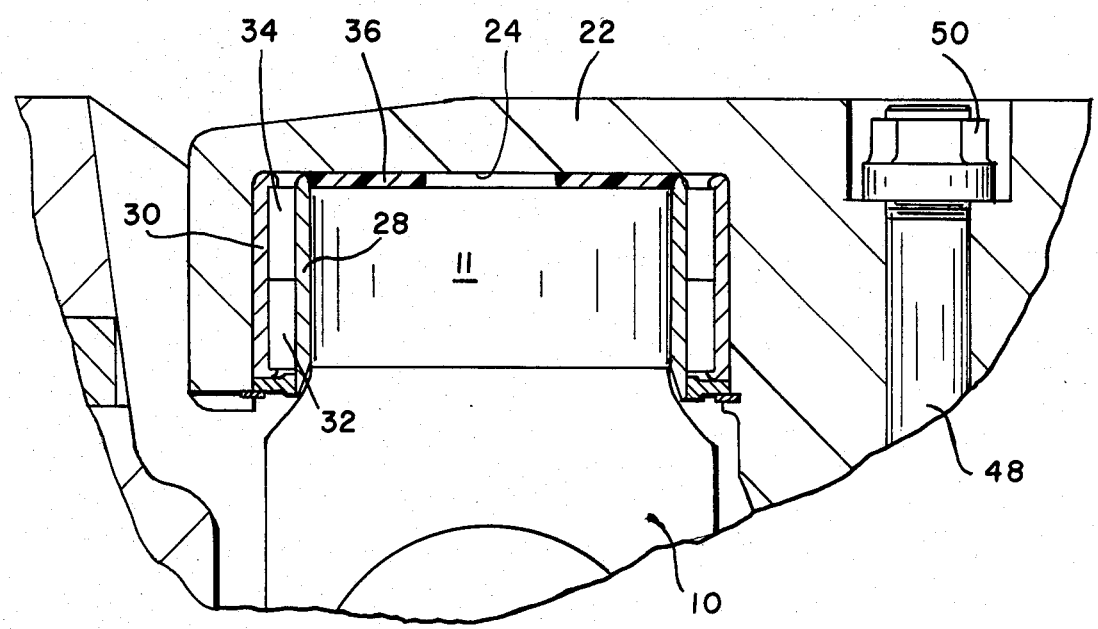
FIG. 5 is an enlarged partial sectional view of one of the bearing caps with a trunnion and bearing assembly received therein.

As can be best seen in FIG. 5, each bearing assembly 26 includes an inner race 28 installed on the trunnion 11, and an outer race 30 with one or more rollers 32, 34 contained in the blind bore 24 of the bearing cap 22. A non-metallic thrust washer 36 is interposed between the end of each trunnion 11 and the bottom of each blind bore 24.

Figure 3:
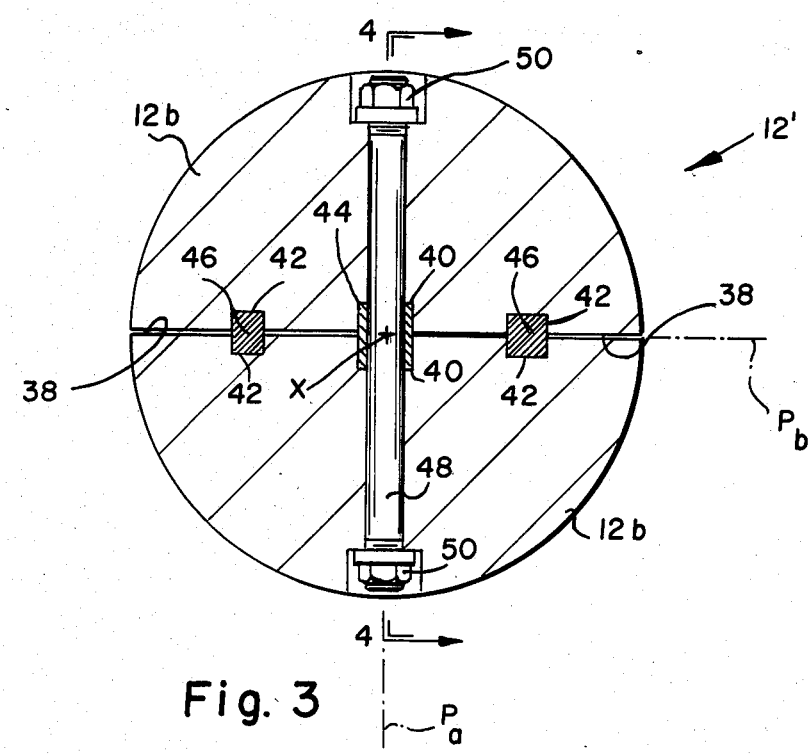
FIG. 3 is a sectional view taken along line 3—3 of FIG. 1.
Figure 4:
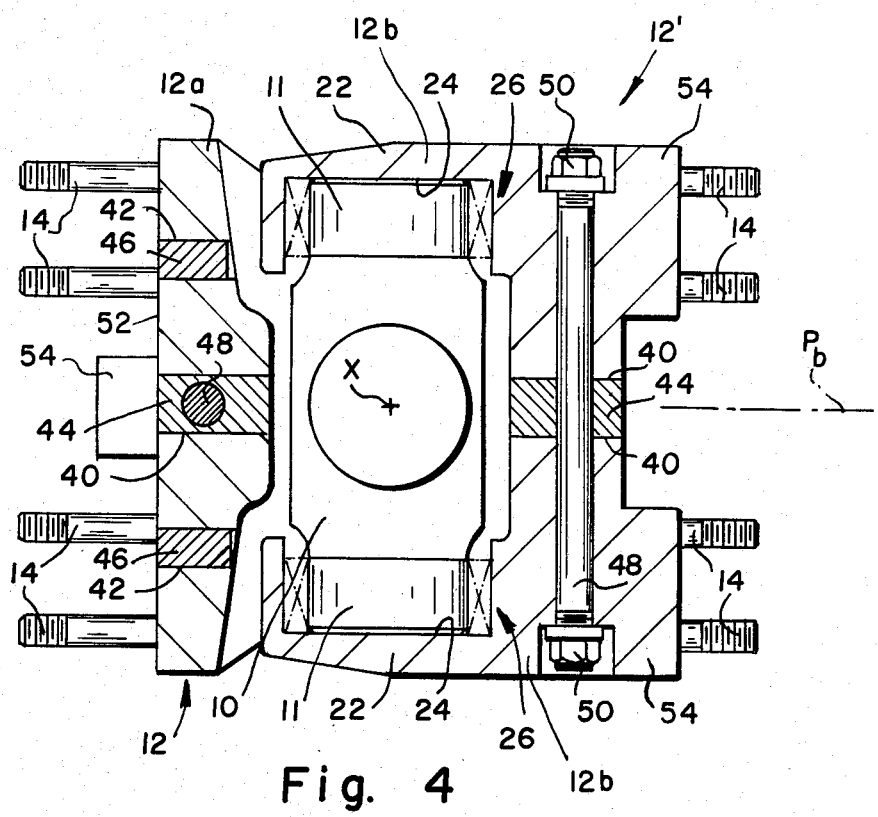
FIG. 4 is a sectional view taken along line 4—4 of FIG. 3.

The half sections 12a, 12a and 12b, 12b have junctures therebetween defined by confronting juxtaposed mating surfaces 38. With reference in particular to FIG. 3, it will be seen that the juncture between half sections 12b, 12b occurs at a first reference plane $P_b$, whereas the juncture between half sections 12a, 12a occurs at a first reference plane $P_a$ which is perpendicular to plane $P_b$.

Both first reference planes $P_a$, $P_b$ pass through the universal joint center "x".

The mutually abutting surfaces between the yokes and their respective shaft end flanges lie on second reference planes $P_c$,$P_d$ (see FIG. 1). The second reference plane of each yoke is perpendicular to the first reference plane of that yoke as well as to the studs 14 connecting that yoke to its respective shaft end flanges. The mating surfaces 38 are machined to provide confronting centrally located keyways 40. Additional confronting channels 42 are located on opposite sides of the keyways 40. A shear key 44 is received in the confronting keyways 40, and spacer blocks 46 are received in the confronting channels 42.

The shear key 44 has side surfaces which are tightly fitted between and which cooperate with the adjacent side surfaces of the keyways 40 to prevent movement of the pairs of half sections 12a,12a and 12b,12b relative to each other in directions which would disturb the coaxial alignment of the bearings 26, i.e., in directions parallel to their respective reference planes $P_a$, $P_b$. This eliminates damaging overloading of either the inner or outer rows of bearing rollers 32, 34.

Each mating pair of half sections 12a,12a and 12b,12b is detachably interconnected by a tie rod 48 extending therethrough and through the shear key 44 in a direction perpendicular to the respective reference plane $P_a$, $P_b$. Nuts 50 are threaded onto the ends of the tie rods.

The spacer blocks 46 have oppositely facing surfaces which cooperate with the bottoms of the channels 42 to laterally locate the half sections with respect to each other on opposite sides of their respective reference planes $P_a$, $P_b$. The spacer blocks insure that the bottoms of the blind bores 24 are located concentrically with respect to the joint center x. The thrust washers 36 provide bearing surfaces for the oscillation movement of the cross and cooperate with the bottoms of the blind bores in locating the cross concentrically with the joint center x.

Figure 6A:
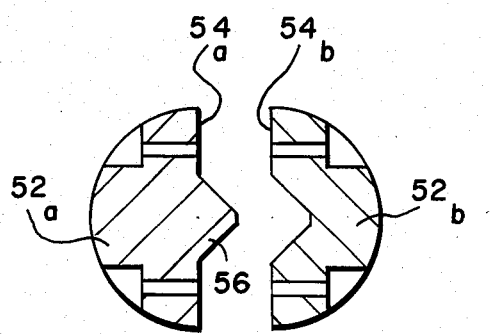
FIGS. 6A, 6B and 7A, 7B are exploded and assembled sectional views respectively of alternate embodiments of yoke assemblies in accordance with the present invention.
Figure 6B:
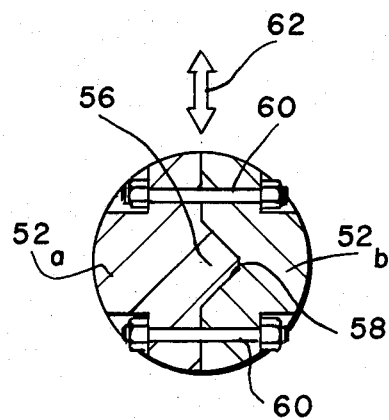

With reference now to FIGS. 6A and 6B, an alternate embodiment of a yoke in accordance with the present invention is shown comprising two half sections 52a, 52b having confronting machined surfaces 54a, 54b. Surface 54a has an integral nose suitably shaped and dimensioned to be tightly received in a notch 58 in surface 54b. When the half sections are separably interconnected by tie bolts 60 as shown in FIG. 6B. The nose 56 cooperates with the notch 58 to prevent relative shifting of the half sections in directions indicated at 62.

Figure 7A:
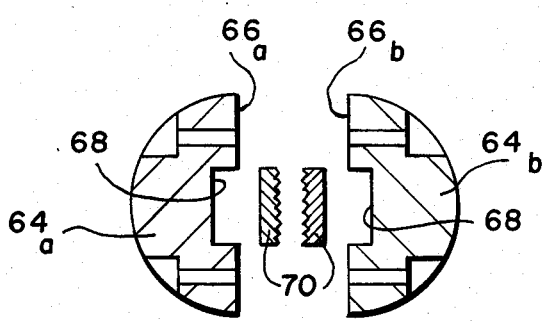
Figure 7B:
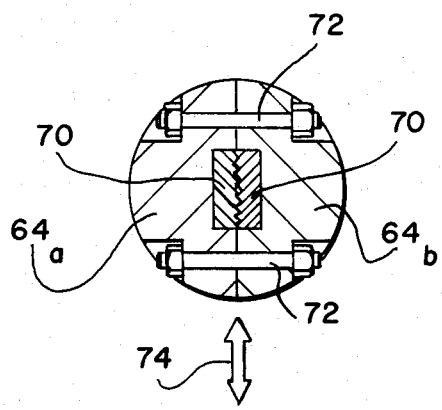

In the embodiment shown in FIGS. 7A, 7B, the two half sections 64a, 64b have confronting machined surfaces 66a, 66b containing grooves 68. Toothed inserts 70 are received in the grooves 68. When the half sections 64a, 64b are assembled and interconnected by tie bolts 72, the toothed inserts 70 engage one another and cooperate with the grooves 68 in again preventing relative shifting in directions indicated at 74.

It thus will be seen that in all cases, interengageable elements are provided at the juncture between the yoke sections. These interengageable elements prevent the half sections from shifting in relation to each other in directions which disturb the coaxial alignment of the trunnion bearings. In a preferred embodiment, additional spacer blocks are interposed at the juncture between their mating surfaces in order to precisely locate the half sections laterally with respect to each other.

I claim:

1. A universal joint for providing a drive connection between the flanged ends of two rotatable elements, said joint comprising:

a cross formed by two mutually perpendicular pairs of coaxially aligned trunnions;

a pair of yokes, each yoke being subdivided into separate mating half sections, each half section including a base portion with an integral forwardly protruding bearing cap having a blind bore formed therein;

bearings contained in said blind bores, the mating half sections of each yoke being adapted for assembly onto a pair of said trunnions, with each trunnion being journalled for rotation in one of said bearings, and with the base portions of the thus assembled mating half sections having juxtaposed surfaces located on opposite sides of a first yoke reference plane passing through the center of the joint;

first key means for opposing relative movement of the thus assembled mating half sections in directions parallel to their respective first yoke reference planes, said first key means lying on said first yoke reference planes and extending into complimentary opposed keyways in said juxtaposed surfaces;

first connecting means for separably interconnecting the thus assembled mating half sections, said first connecting means extending through said mating half sections in directions perpendicular to their respective first yoke reference planes;

second connecting means for detachably mounting the thus assembled and interconnected mating half sections to a respective one of said flanged ends, said mating half sections and said flanged ends having mutually abutting surfaces lying on second yoke reference planes which are perpendicular to the respective second connecting means and the first yoke reference planes; and second key means for mechanically coupling the thus assembled, interconnected and mounted mating half sections to their respective flanged ends, said second key means being formed integrally with said half sections and protruding rearwardly therefrom into recesses in said flanged ends.

2. The universal joint of claim 1 wherein said first connecting means extend through said first key means.

3. The universal joint of claim 1 wherein said first key means and said complimentary opposed keyways are centrally located, and wherein said first connecting means extend through said first key means.

4. The universal joint of claim 1 further comprising confronting channels in said juxtaposed surfaces, and spacer elements received in said channels, said spacer elements having oppositely facing surfaces cooperating with the bottoms of said channels to laterally locate said mating yoke half sections with respect to each other.

* * * * *